United States Patent [19]

Johansson

[11] Patent Number: 5,156,519
[45] Date of Patent: Oct. 20, 1992

[54] STORAGE DEVICE, THE USE OF AN OPERATING DEVICE AND AN OPERATING DEVICE

[75] Inventor: Evald V. Johansson, Gothenburg, Sweden

[73] Assignee: Econd'or Sweden AB, Gothenburg, Sweden

[21] Appl. No.: 438,462

[22] PCT Filed: Jun. 22, 1988

[86] PCT No.: PCT/SE88/00345
§ 371 Date: Dec. 6, 1989
§ 102(e) Date: Dec. 6, 1989

[87] PCT Pub. No.: WO88/10225
PCT Pub. Date: Dec. 29, 1988

[30] Foreign Application Priority Data

Jun. 24, 1987 [SE] Sweden .............................. 87026050

[51] Int. Cl.⁵ .............................................. B65G 7/08
[52] U.S. Cl. .................................. 414/608; 414/607; 414/778; 414/680; 108/52.1
[58] Field of Search ............... 414/607, 608, 498, 783, 414/754, 680, 332, 10, 620, 785, 778; 108/52.1, 51.1

[56] References Cited

U.S. PATENT DOCUMENTS

| | | | |
|---|---|---|---|
| 1,836,362 | 12/1931 | Crowley | 414/608 X |
| 2,756,886 | 7/1956 | Schaffer | 414/607 |
| 3,595,414 | 7/1971 | Brown et al. | 414/607 |
| 3,838,779 | 10/1974 | Dawson | 414/778 |
| 3,861,546 | 1/1975 | Montgomery | 414/778 X |
| 3,970,205 | 7/1976 | Del Puppo | 414/778 X |
| 4,340,333 | 7/1982 | Cashio | 414/607 |

FOREIGN PATENT DOCUMENTS

| | | | |
|---|---|---|---|
| 137832 | 5/1978 | Denmark . | |
| 931579 | 8/1955 | Fed. Rep. of Germany | 414/607 |
| 1162284 | 1/1964 | Fed. Rep. of Germany . | |
| 1958958 | 6/1970 | Fed. Rep. of Germany . | |
| 3207227 | 9/1983 | Fed. Rep. of Germany | 414/620 |
| 128287 | 5/1950 | Sweden . | |
| 363939 | 9/1962 | Switzerland | 414/608 |
| 1126535 | 11/1984 | U.S.S.R. | 414/620 |

Primary Examiner—Frank E. Werner
Attorney, Agent, or Firm—Harness, Dickey & Pierce

[57] ABSTRACT

A storage device designed to store primarily elongate objects, and comprising on the one hand a frame and on the other an operating device arranged on a fork lift truck. The storage device is arranged in such a manner that it may be shifted between an essentially vertical space-saving storage position and a horizontal position allowing loading and unloading operations to be performed in a simplified manner.

18 Claims, 3 Drawing Sheets

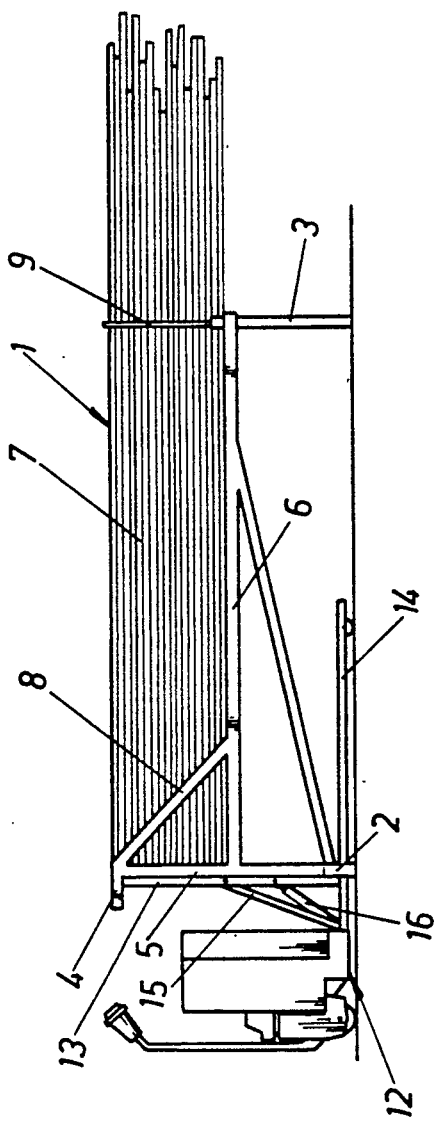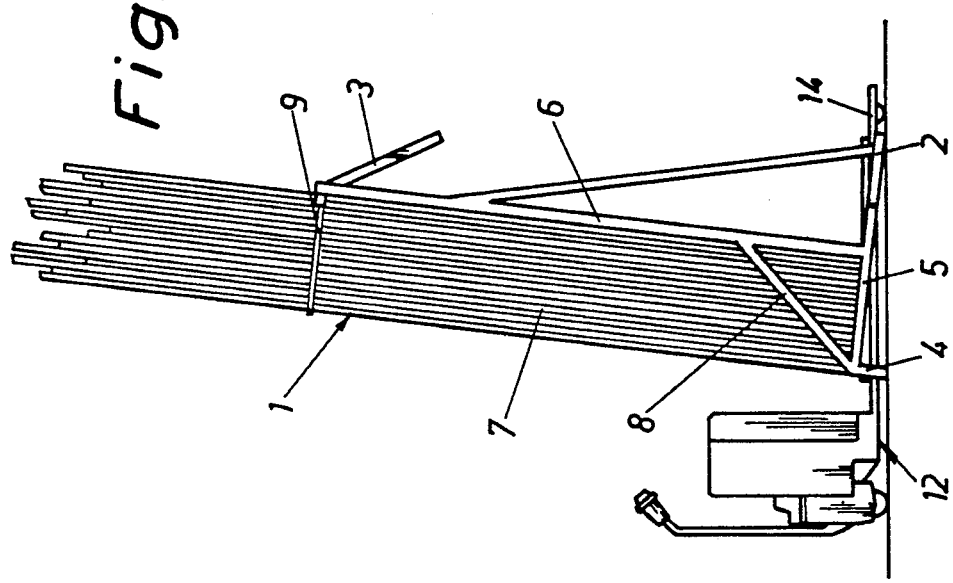

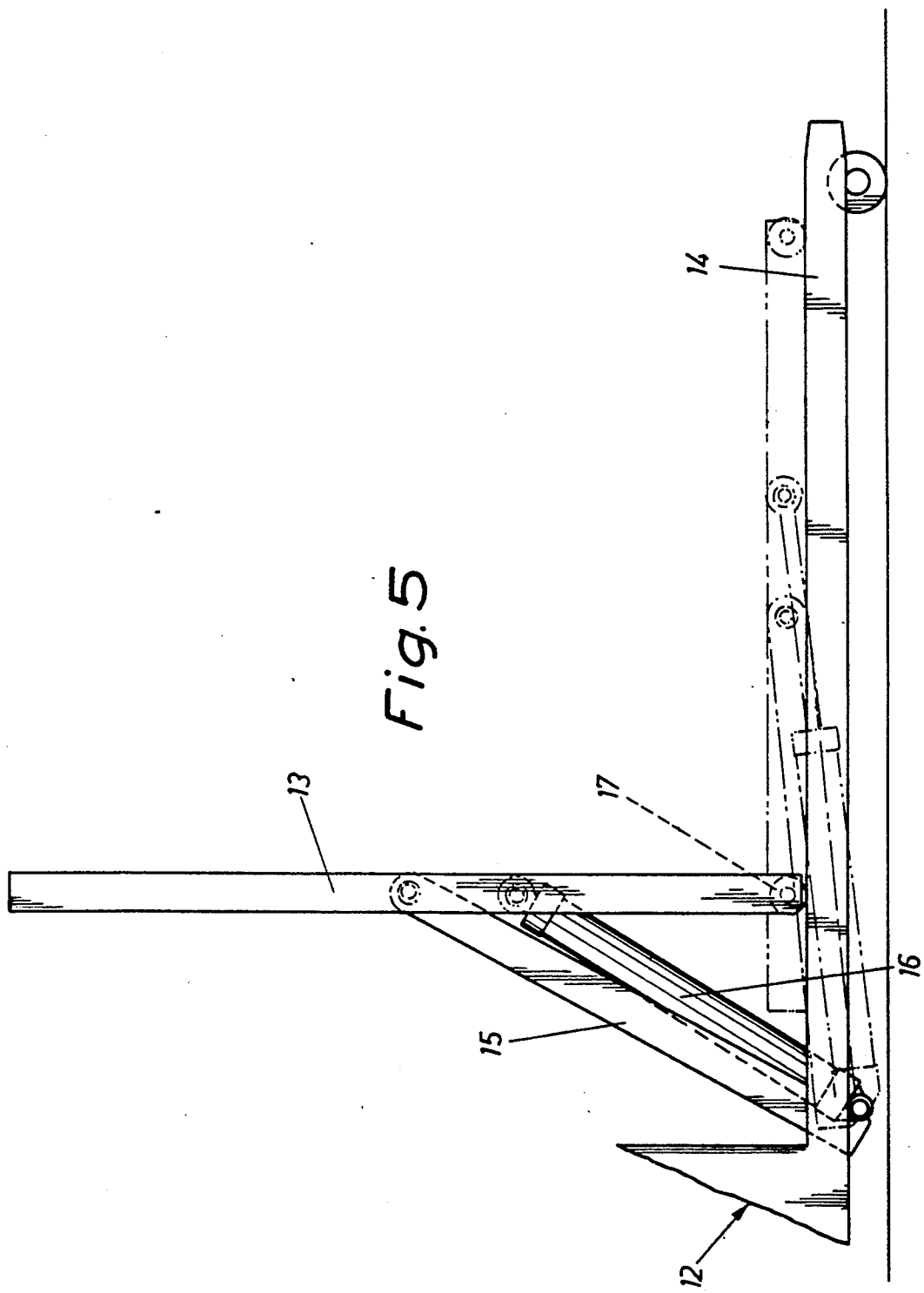

STORAGE DEVICE, THE USE OF AN OPERATING DEVICE AND AN OPERATING DEVICE

BACKGROUND OF THE INVENTION

The subject invention concerns an operating device for a storing device which is designed to store primarily elongate objects such as timber, tubing and similar articles and which comprises a frame which is provided with leg members and which is designed to support the objects thereon. The leg members of the device are mounted in such a manner as to allow the storing device to be placed both in a horizontal position for loading and unloading of said objects and in an essentially vertical position intended primarily for storage of said objects, in which latter position the device occupies a considerably smaller ground area than in its horizontal position.

The conventional method of storing elongate objects is to simply push them into horizontal compartments. However, this storage method suffers from a number of disadvantages, both from a handling and storage economy aspect. For instance, when elongate objects are stored in the conventional way they have to be pushed into their individual compartments manually, which is very time consuming and therefore uneconomical. In addition, the operation requires a large physical effort and the strain on the worker's back is considerable particularly, when the objects are heavy, for instance as is the case of battens or tubes. Further, the method makes it difficult to store the articles at high levels out of the worker's normal reach, in which case it becomes necessary to construct gangways or to use ladders. However, ladders are useful only when the articles are comparatively light and short.

A further serious disadvantages inherent in this conventional storing system is that the aisles alongside the storage compartments must be at least as wide as the stored objects are long. This means that considerable space in the subject area remains unused and wasted, which is not economically justifiable, particularly not in indoor storage premises.

One prior-art structure which aims at reducing these disadvantages concerns a storage system in which the compartments are provided with transverse rollers. This construction allows bundled or packaged objects, such as timbers, to be pushed into the compartments as one integral unit. However, a particular pushing mechanism is required to put the bundled objects or units in position, which mechanism comprises a motor-operated steel-frame conveyor belt. The steel frame is quite heavy and a powerful fork lift truck is required for its displacement. A high-rank fork lift truck must be used to deposit the timber bundles in compartments situated above the lowermost storage level. The prior-art construction solves only the problem of handling entire timber bundles. All disadvantages found previously, such as handling a small number of objects, wide aisles and difficult accessibility at high storage levels still remain.

SUMMARY OF THE INVENTION

The purpose of the subject invention is to provide a system for storing and handling essentially elongate objects in which the disadvantages outlined above are eliminated.

This purpose is achieved in an operating device which is characterized therein that the device comprises a handling frame which is connectable to the storage device and which is articulated to an operating mechanism, such as a fork lift truck, by means of at least one stay and at least one double-acting piston-and-cylinder unit for folding the handling frame from an upright position to a collapsed position in which it is supported on the forks of the truck, said frame being again erectable to the upright position and when being moved to its erected position arranged to bring along said storage device from the vertical position thereof to an essentially horizontal position and vice versa.

BRIEF DESCRIPTION OF THE DRAWINGS

One preferred embodiment of the invention will be described in the following with reference to the accompanying drawings, wherein FIG. 3 is a lateral view of a storing device in accordance with the invention, shown in its erected storing position and coupled to an operating truck, FIG. 4 is a view corresponding to FIG. 3 but showing the device in its horizontal collapsed loading an unloading position, and FIG. 5 is a lateral view of a part of the operating truck, showing the truck operating frame in both end positions thereof.

DETAILED DESCRIPTION OF A PREFERRED EMBODIMENT

Figure 1:
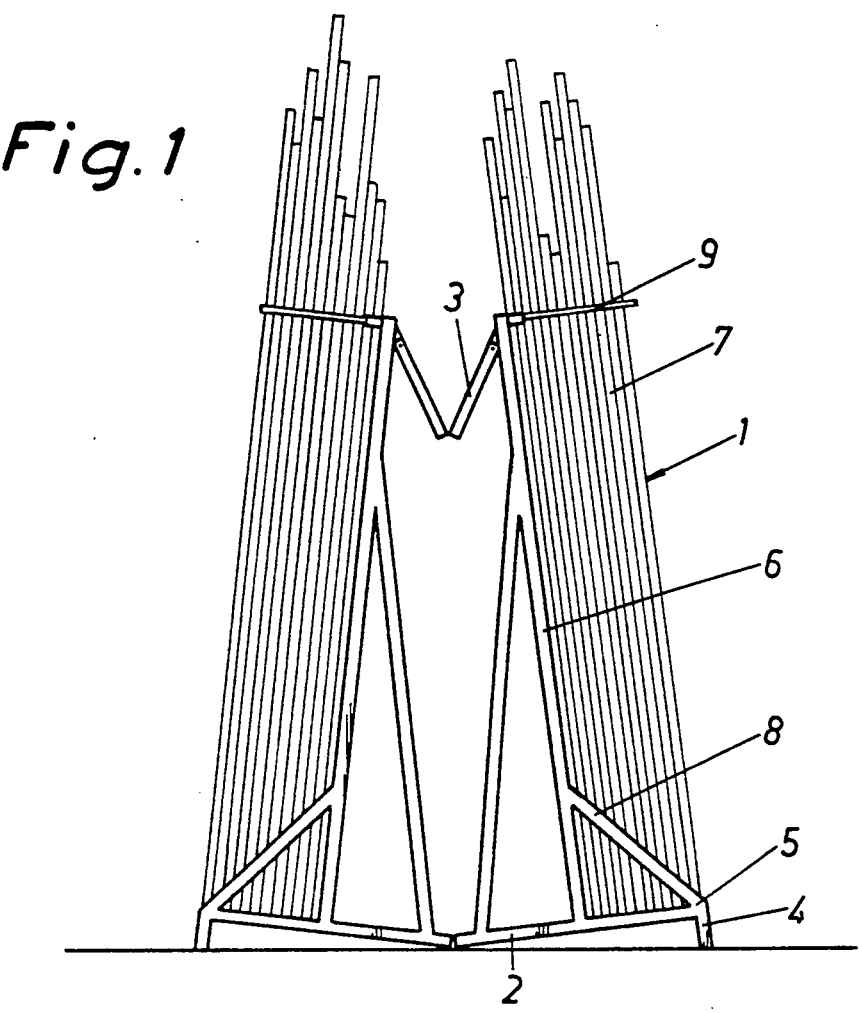
FIG. 1 is a lateral view of two storing devices which are positioned in the erected storing position and are fully loaded with timber.

The storing device 1 mainly consists of a frame 6 which is provided with a number of leg members 2, 3, 4 and an end plate 5 and onto which frame the articles 7 to be stored, such as timber, may be deposited. To prevent the objects 7 from sliding off the frame laterally the frame is also provided with obliquely extending lateral stays 8 adjacent the end plate 5 and at the opposite end of the device with removable lateral rods 9.

The storing device 1 comprises one pair of fixed leg members 2 extending perpendicularly away from the frame 6 in the form of an extension of the end plate 5, and one pair of leg members 3 positioned at the opposite end of the frame 6. The latter pair of leg members 3 are foldable or collapsible in order to allow a number of storing devices 1 to be erected close to another, as is clearly shown in FIG. 1. Owing to this arrangement efficient use may be made of the available storage space. The device also has yet another pair of leg members 4 extending perpendicularly relative to the other pairs of leg members 2, 3 and being secured to the extremity of the end plate 5 which faces away from the frame 6. This pair of leg members thus is used in the storing position, as illustrated in FIG. 1.

Figure 2:
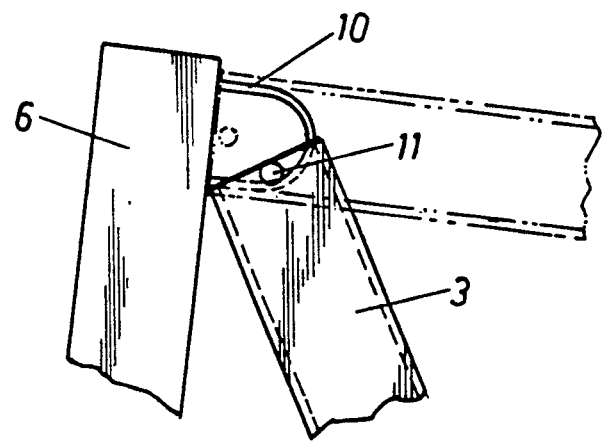
FIG. 2 is a detail view on an enlarged scale of the fitting means for attachment of the upper collapsible support leg member of the device.

FIG. 2 shows one embodiment of a fitting member for attachment of the foldable or collapsible leg members 3 to the frame 6. The fitting member comprises a U-shaped yoke member 10 the two arms of which are secured in the frame 6. The leg member 3 which preferably consists of a tube of square cross-sectional shape is provided with a through-hole at its upper end through which a pin 11 is inserted in such a manner that it passes through the U-shaped yoke member 10 on the frame 6. The size of the yoke 10 preferably is chosen to ensure a good fit between the yoke member and the tube forming the leg member 3. In this manner, the leg member 3 is locked in position when under load (illustrated in dash-and-dot lines).

FIGS. 3 and 4 illustrate the storing device when coupled to an operating truck 12. FIG. 3 shows the erected loading position, in which the storing device normally is supported on the leg members 2 and 4, and FIG. 4 illustrates the folded or collapsed position devised for loading and unloading operations and during which the storing device normally is supported on the leg members 2 and 3.

FIG. 5 is a lateral view of a part of the operating truck 12 and shows the operating frame 13 in accordance with the invention and the control means therefor. This drawing figure also shows the various positions from and into which the operating frame 13 may be moved in order to allow the storing device 1 to be erected and folded without the leg members 2, 3, 4 trailing on the ground. The frame 13 is attached to the forks 14 of the fork lift truck 12, both by means of oblique stays 15 and by means of at least one double-acting piston-and-cylinder unit 16. In addition, support wheels 17 are provided at one end of the frame 13, said wheels resting on the forks 14 of the truck 12. In the drawing figure, the frame 13 is illustrated in the position corresponding to the lower, folded position of the storing device shown in FIG. 4. In addition, dash-and-dot lines show the position of the frame corresponding to the erected position of the storing device illustrated in FIG. 3. The frame 13 is also provided with automatic locking means, not shown, allowing the frame to be coupled to the storing device either in the lower folded position thereof (FIG. 4) or in its erected position (FIG. 3).

An important advantage gained by the manner described in the aforegoing of attaching the operating frame 13 to the truck 12 is that when shifting from the position in FIG. 3 to the position in FIG. 4 the centre of gravity of the storing device 1 is displaced inwards, towards the truck 12, which would not have been the case, had the frame been attached at its lower part merely by means of hinges to the fork 14 of the truck 12. In turn, this means that the forks 14 of the truck 12 may be shorter, which adds to the maneuverability of the truck.

The storing device thus functions in the following manner. With the device 1 in its lower, folded position (FIG. 4) timber, tubing or the like is loaded thereon. The operating truck 12 with the operating frame 13 is then coupled to the storing device 1, and the latter may be erected to the position shown in FIG. 3, which is the storing position. Because the leg members 3 are foldable, two devices may be juxtaposed in comparatively close relationship, as illustrated in FIG. 1. In opposition to prior-art storing systems wide aisles are not either required between the rows of juxtaposed storing device 1, since the latter may be pivoted before being folded to their collapsed position illustrated in FIG. 4. Because the storing devices 1 may be positioned freely considerable flexibility and freedom is gained as regards the structure of the storing premises since no stationary stands or similar structural means are required.

Another advantages found in the storing device 1 is that because it is easy to transport it may be used as an integral "package" in which e.g. timber may be transported and handled. The work may for instance be worked in a carpentry, e.g. be severed, planned or submitted to similar treatments and then be transferred straight into a storing device 1 instead of first being bundled. The storing device 1, loaded with the thus treated wood, may then be driven to the storage and/or sales premises and be erected without the timber having to be shifted even once. In the sales premises the customer may select the timber straight from the vertically erected storing device 1. When used in this way it is advantageous to provide the storing device 1 with a label holder (not shown) in which labels may be inserted on which information on the stored timber may be displayed. Examples of such information are the nature of the timber, the dimensions of the wood, prices an so on.

Finally, it should be pointed out that the invention is not limited to the embodiment described in the aforegoing but that a number of different embodiments are possible within the scope of the appended claims. For instance, the storing device may be provided with additional lateral supports in the form of nets or similar means for storage ob bulky, non elongate objects, such as bales of insulating material. Furthermore, the operating truck 12 may be replaced by a fork lift truck on the forks of which is attached an operating frame 13 in a manner similar to that shown in FIG. 5.

The storing device 1 could also be provided with means allowing removable attachment of a measuring rod for instance alongside one side of the frame.

What I claim is:

1. A space saving storage device comprising a frame, having a plurality of sides and ends, for receiving elongated articles, a first support extending from one side of said frame for supporting said frame in a substantially horizontal position on a floor for loading and unloading of the elongated articles on said frame, a second support extending from one of the ends of said frame for supporting said frame in a substantially vertical position in which position said storage device occupies a substantially lesser floor area than when said frame is supported in a horizontal position, a manipulating device including a pivotal member engageable at said one end of said frame and an actuating member operably attached to said pivotal member for facilitating movement of said frame between said substantially horizontal and said substantially vertical positions, and an operating truck for operating said manipulating device for pivoting said frame between its positions.

2. A space saving storage device as set forth in claim 1 wherein said pivotal member comprises an elongated member having a roller at one end thereof adapted to engage a movable support of said operating truck, a link having one end pivotally connected to said elongated member between its ends and another end pivotally connected to said movable support, and wherein said actuating member is operably attached to said elongated member for moving said elongated member between a substantially horizontal position and a substantially vertical position.

3. A space saving storage device as recited in claim 2, wherein said actuating member is operably attached to said movable support.

4. A space saving storage device as recited in claim 1, wherein said first support comprises a first plurality of leg members extending from one side of said frame and adapted to engage the floor when said frame is in said substantially horizontal position.

5. A space saving storage device as recited in claim 4, wherein said second support comprises a second plurality of leg members extending from said end of said frame generally perpendicular to said first plurality of leg members and adapted to engage the floor when said frame is in said substantially vertical position.

6. A space saving storage device as recited in claim 4, wherein at least one of said first plurality of leg members is pivotal relative to said frame, when said frame is not supported in said substantially horizontal position, to a position adjacent said frame for minimizing space occupation when said frame is not supported in said substantially horizontal position.

7. A space saving storage device as recited in claim 1, wherein said frame further comprises a pair of transverse support members adapted to restrain the elongated articles on said frame when said frame is in either its substantially horizontal or substantially vertical position.

8. A space saving storage device as recited in claim 7, wherein said transverse support members comprises diagonal braces attached to said support.

9. A space saving storage device as recited in claim 1, wherein said actuating member comprises a piston-cylinder unit.

10. A space saving storage device comprising a frame, having a plurality of sides and ends, for receiving elongated articles, a first support extending from one side of said frame for supporting said frame in a substantially horizontal position on a floor for loading and unloading of the elongated articles on said frame, a second supporting said frame in a substantially vertical position in which position said storage device occupies a substantially lesser floor area than when said frame is supported in a horizontal position, said first and said second supports including a common member about which said storage device may pivot for movement of said storage device between its positions, a manipulating device including a pivotal member engageable with said common member and an actuating member operably attached to said pivotal member for bringing about the pivotal of said frame, and an operating truck for operating said manipulating device for pivoting said frame between its positions.

11. A space saving storage device as set forth in claim 10 wherein said pivotal member comprises an elongated member having a roller at one end thereof adapted to engage a moveable support of said operating truck, a link having one end pivotally connected to said elongated member between its ends and another end pivotally connected to said movable support, and wherein said actuating member is operably attached to said elongated member for moving said elongated member between a substantially horizontal position and a substantially vertical position.

12. A space saving storage device as recited in claim 11, wherein said actuating member is operably attached to said movable support.

13. A space saving storage device as recited in claim 10, wherein said first support comprises a first plurality of leg members extending from one side of said frame and adapted to engage the floor when said frame is in said substantially horizontal position.

14. A space saving storage device as recited in claim 13, wherein said second support comprises a second plurality of leg members extending from said end of said frame generally perpendicular to said first plurality of leg members and adapted to engage the floor when said frame is in said substantially vertical position.

15. A space saving storage device as recited in claim 13, wherein at least one of said first plurality of leg members is pivotal relative to said frame, when said frame is not supported in said substantially horizontal position, to a position adjacent said frame for minimizing space occupation when said frame is not supported in said substantially horizontal position.

16. A space saving storage device as recited in claim 10, wherein said frame further comprises a pair of transverse support members adapted to restrain the elongated articles on said frame when said frame is in either its substantially horizontal or substantially vertical position.

17. A space saving storage device as recited in claim 16, wherein said transverse support members comprises diagonal braces attached to said second support.

18. A space saving storage device as recited in claim 10, wherein said actuating member is operably attached to said movable support.

* * * * *

UNITED STATES PATENT AND TRADEMARK OFFICE
CERTIFICATE OF CORRECTION

PATENT NO. : 5,156,519

DATED : October 20, 1992

INVENTOR(S) : Evald V. Johansson

It is certified that error appears in the above-identified patent and that said Letters Patent is hereby corrected as shown below:

Column 5, line 20, Claim 8, after "said" insert --second--.

Column 5, line 30, Claim 10, after "second" insert --support extending from one of the ends of said frame for--.

Column 5, line 40, Claim 10, "pivotal" should be --pivoting--.

Column 6, lines 42-43, Claim 18 "is operably attached to said movable support" should be --comprises a piston-cylinder unit--.

Signed and Sealed this

Fifth Day of October, 1993

*Attest:*

BRUCE LEHMAN

*Attesting Officer*     Commissioner of Patents and Trademarks